(12) United States Patent
Lee et al.

(10) Patent No.: US 7,299,010 B2
(45) Date of Patent: Nov. 20, 2007

(54) APPARATUS AND METHOD FOR ESTIMATING A VELOCITY OF A MOBILE TERMINAL IN A MOBILE COMMUNICATION SYSTEM

(75) Inventors: Ji-Ha Lee, Seoul (KR); Sung-Kwon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 10/941,092

(22) Filed: Sep. 15, 2004

(65) Prior Publication Data

US 2005/0060094 A1    Mar. 17, 2005

(30) Foreign Application Priority Data

Sep. 16, 2003    (KR)  ............... 10-2003-0064041

(51) Int. Cl.
*H04B 17/00*    (2006.01)
(52) U.S. Cl. .................. 455/62; 455/63.1; 455/67.11; 455/266.1; 455/561
(58) Field of Classification Search ............... 455/441, 455/62, 63.1, 63.3, 67.11, 67.13, 67.16, 226.1, 455/226.2, 226.3, 226.4, 561, 562.1
See application file for complete search history.

(56) References Cited

U.S. PATENT DOCUMENTS 6,377,813 B1 *    4/2002 Kansakoski et al. ........ 455/522

2002/0042279 A1 *    4/2002 Da Rocha et al. .......... 455/456
2002/0044593 A1 *    4/2002 Kuo .......................... 375/148

* cited by examiner

Primary Examiner—Philip J. Sobutka
(74) Attorney, Agent, or Firm—Roylance, Abrams, Berdo & Goodman, L.L.P.

(57) ABSTRACT

Apparatus and method are provided in a BS (Base Station) apparatus of a mobile communication system including a velocity estimator for estimating a velocity of a mobile station (MS) and a channel estimator for performing channel estimation using a plurality of channel estimation coefficients according to a control signal of the velocity estimator. The apparatus and method comprise estimating reception performance of individual channel estimation coefficients of the channel estimator, and selecting boundary frequencies of a plurality of Doppler frequency bands corresponding to a channel estimation coefficient having the best reception performance; measuring a power spectrum associated with a minimum number of frequency indexes capable of classifying the plurality of Doppler frequency bands; and controlling a detection position such that a Doppler frequency boundary value measured when a weight value is applied to the measured power spectrum approximates a desired Doppler frequency boundary value.

8 Claims, 5 Drawing Sheets

APPARATUS AND METHOD FOR ESTIMATING A VELOCITY OF A MOBILE TERMINAL IN A MOBILE COMMUNICATION SYSTEM

PRIORITY

This application claims the benefit under 35 U.S.C. 119(a) of an application entitled "METHOD FOR ESTIMATING VELOCITY OF MOBILE TERMINAL IN MOBILE COMMUNICATION SYSTEM", filed in the Korean Intellectual Property Office on Sep. 16, 2003 and assigned Serial No. 2003-64041, the entire contents of which are hereby incorporated by reference.

BACKGROUND OF THE INVENTION

1. Field of the Invention

The present invention relates to an apparatus and method for estimating the velocity of a mobile terminal in a mobile communication system. More particularly, the present invention relates to an apparatus and method for estimating the velocity of a mobile terminal by controlling a velocity detection position of a velocity estimator in a mobile communication system.

2. Description of the Related Art

Mobile communication systems were developed to provide a mobile terminal (also called a mobile station (MS)) with mobility. The mobile communication system forms a channel between a base station (BS) and the MS to provide the mobility of the MS, such that it performs voice and data communication over the channel. The MS provides mobility, such that a wireless signal generated from the MS does not always transmit an output signal at a fixed position. Specifically, the MS can constantly transmit the wireless signal at different positions, such that an environment and a path of a wireless channel are continuously changed. The MS moves with its user, such that it can transmit a wireless signal in a stationary state, or can transmit the wireless signal while in motion at a low or high speed.

As previously discussed, channel environments change in the mobile communication system, and a transmission path of a wireless signal also changes due to the change of an MS's position, such that the mobile communication system must receive data in consideration of the changed channel environments, the changed MS's position and the speed of the MS, and so on. Specifically, the mobile communication system estimates a transmission channel of the MS, and extracts data according to the estimated result. Therefore, provided that channel estimation of the MS is not correctly performed, the mobile communication system cannot extract correct data. If the mobile communication system cannot estimate a correct channel, it is unable to extract data.

The channel estimation method of the mobile communication system will hereinafter be described. The mobile communication system transmits data to the MS over a forward link from the BS to the MS. In this case, the BS transmits a traffic channel signal and a pilot signal in order to allow the MS to perform channel estimation. The MS transmits data to the BS over a reverse link transmitted to the BS. In this case, the MS transmits a reverse pilot signal to allow the BS to estimate a reverse channel. Upon receiving the reverse pilot signal from the MS, the BS performs channel estimation using the received reverse pilot signal. The BS decodes a traffic signal received from a corresponding MS on the basis of the channel-estimated value. In this manner, if the decoding of the traffic signal is performed, data reception performance can be improved.

However, the Doppler shift occurs in a reverse pilot channel and a reverse traffic channel according to the velocity of the MS. Due to the Doppler shift, real channel estimation performance may be deteriorated. Specifically, the real channel estimation performance is changed in proportion to the shifting degree of a received signal. Also, the Doppler shift effect results in different values according to a velocity of the MS. Therefore, the BS must remove the Doppler shift at individual velocities of the MS to fully remove the Doppler shift effect and must also perform channel estimation at individual velocities of the MS, such that the BS requires a channel estimator at each velocity of the MS in order to remove the Doppler shift effect and perform the channel estimation.

A method for estimating such velocities of the MS in a mobile communication system will hereinafter be described. The mobile communication system has divided the velocity of the MS into several velocity zones, and has a previously-designed optimum channel estimator for providing optimum channel estimation performance at each velocity zone. In this case, a plurality of channel estimators are used according to different velocities of the MS, such that a category of the channel estimator to be used must first be determined. In order to select the category of the channel estimator, a velocity estimator is required to estimate the velocity of the MS on the basis of a received signal. There are two methods for implementing the velocity estimator, i.e., a first method for adapting an autocorrelation function of a received signal in a time domain, and a second method for adapting a Discrete Fourier Transform (DFT) in a frequency domain.

As described above, the velocity estimator using the DFT discretely estimates the Doppler spectrum, and a velocity detection position of the velocity estimator depends on DFT frequency resolution due to discrete spectrum estimation unavoidably generated during digital signal processing. Therefore, the velocity detection position of the velocity estimator must be controlled to correctly estimate the velocity of the MS.

SUMMARY OF THE INVENTION

Therefore, the present invention has been made in view of the above problems, and it is an object of the present invention to provide an apparatus and method for controlling a velocity detection position of the velocity estimator to estimate a moving velocity of an MS regardless of frequency resolution.

In accordance with the an aspect of the present invention, the above and other objects can be accomplished by the provision of a method for estimating the velocity of a mobile station (MS) to adjust a velocity detection position of a velocity estimator in a Base Station (BS) apparatus of a mobile communication system including the velocity estimator for estimating the velocity of the MS and a channel estimator for performing channel estimation using a plurality of channel estimation coefficients according to a control signal of the velocity estimator comprising the steps of estimating reception performance of individual channel estimation coefficients of the channel estimator, and selecting boundary frequencies of a plurality of Doppler frequency bands corresponding to a channel estimation coefficient having the best reception performance; measuring a power spectrum associated with a minimum number of frequency indexes capable of classifying the plurality of Doppler frequency bands; and controlling a detection position such that a Doppler frequency boundary value measured when a weight value is applied to the measured power spectrum approximates a desired Doppler frequency boundary value.

In accordance with the present invention, there is provided an apparatus for estimating a velocity of a mobile station (MS) in a base station (BS) device of a mobile communication system. The apparatus comprises a channel estimator classified according to a velocity band, for performing channel estimation using channel estimation coefficients optimized for individual velocity bands; and a velocity estimator for estimating reception performances of individual channel estimation coefficients, selecting a boundary frequency of Doppler frequency bands corresponding to channel estimation coefficients having the best reception performance, measuring a power spectrum associated with a minimum number of frequency indexes capable of classifying the Doppler frequency bands, applying a weight value to the measured power spectrum, controlling a detection position to approximate a desired Doppler frequency boundary value in a Doppler frequency boundary value measured when a weight value is applied to the measured power spectrum, and performing velocity estimation.

BRIEF DESCRIPTION OF THE DRAWINGS

The above and other objects, features and other advantages of the present invention will be more clearly understood from the following detailed description taken in conjunction with the accompanying drawings, in which.

Throughout the drawings, it should be noted that the same or similar elements are denoted by like reference numerals.

DETAILED DESCRIPTION OF THE PREFERRED EMBODIMENTS

Embodiments of the present invention will now be described in detail with reference to the accompanying drawings. In the following description, a detailed description of known functions and configurations incorporated herein will be omitted for conciseness.

Figure 1:
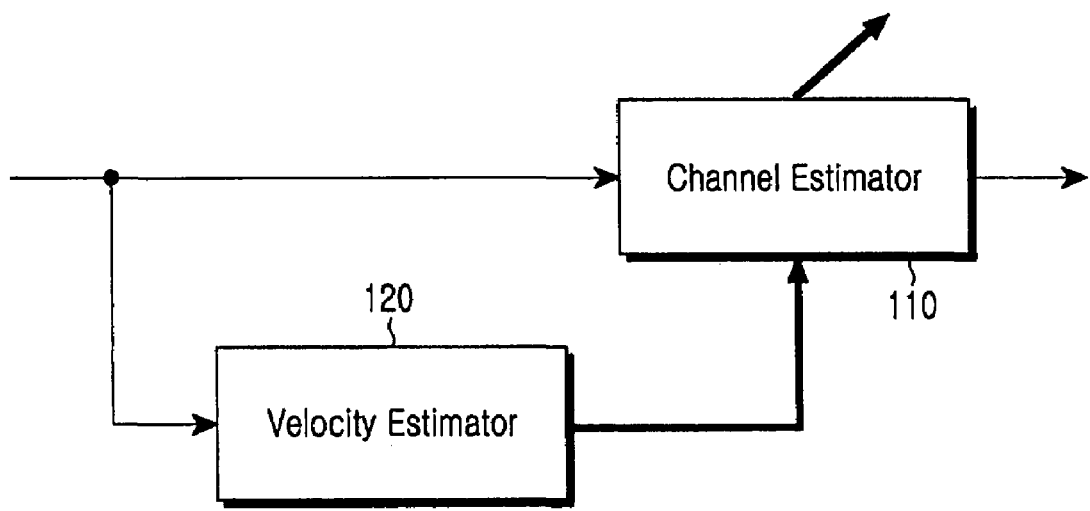
FIG. 1 is a block diagram illustrating a velocity estimator for use in a Base Station (BS) in accordance with an embodiment of the present invention.

FIG. 1 is a block diagram illustrating a velocity estimator for use in a Base Station (BS) in accordance with an embodiment of the present invention.

Referring to FIG. 1, the velocity estimator includes a channel estimator 110 and a velocity estimator 120. The velocity estimator 120 estimates the moving velocity of a Mobile Station (MS) to control the channel estimator 110.

The channel estimator 110 is used differently according to individual velocity bands, and performs channel estimation using optimum estimation coefficients of individual velocity bands. The channel estimation coefficients are optimized in $M_{vel}$ Doppler frequency bands corresponding to $M_{vel}$ velocity bands, and may also be designed using an offline method. Individual Doppler frequency bands in which individual channel estimation coefficients are to be used are detected using a Discrete Fourier Transform (DFT) method. Such Doppler frequency bands corresponding to individual channel estimation coefficients can be determined in different ways, and a representative example for selecting a desired Doppler frequency band will hereinafter be described with reference to the accompanying drawings.

Figure 2:
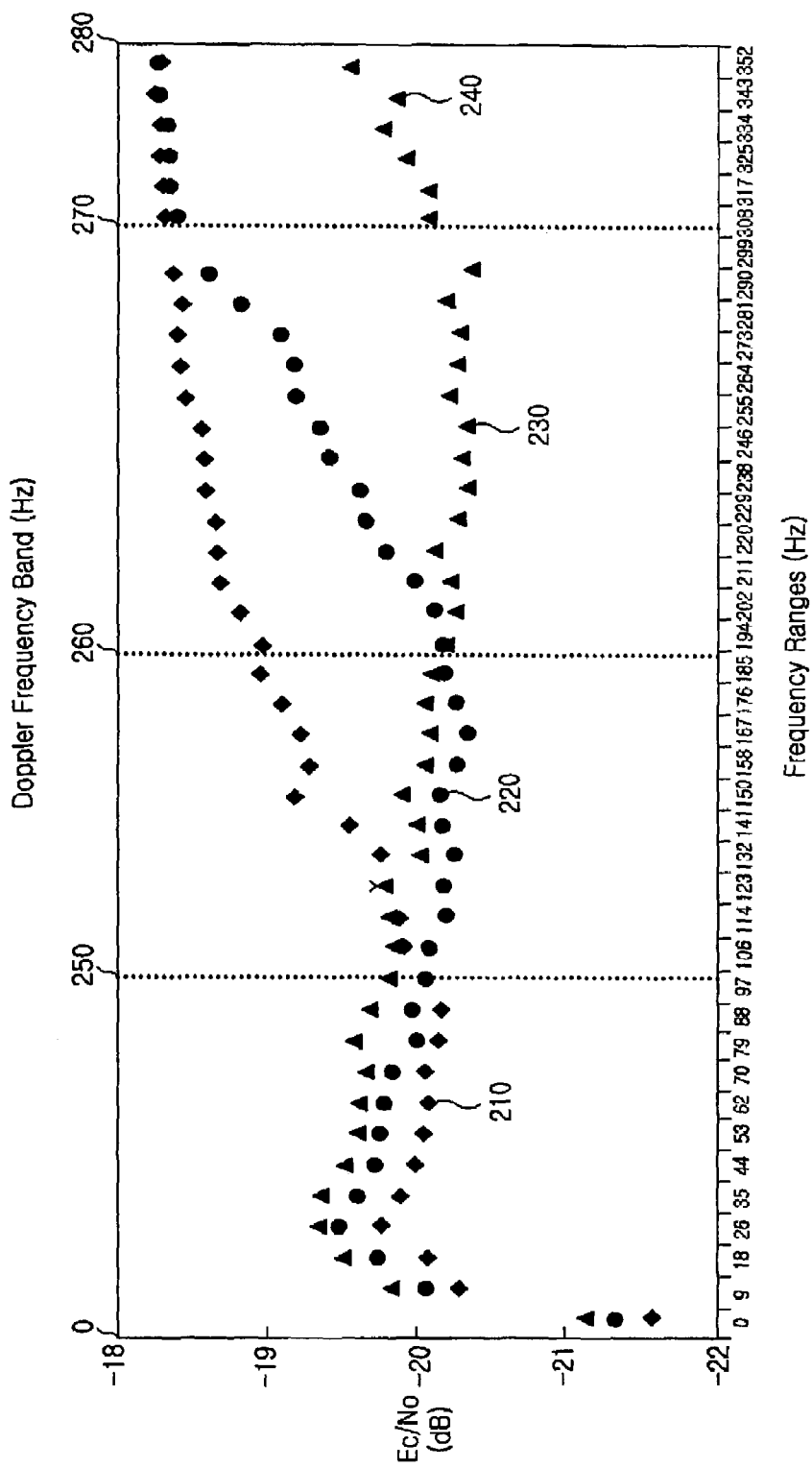
FIG. 2 is a graph illustrating reception performances of individual channel estimation coefficients in accordance with an embodiment of the present invention.

FIG. 2 is a graph illustrating reception performances of individual channel estimation coefficients in accordance with an embodiment of the present invention. In FIG. 2, a velocity band ($M_{vel}$) is determined to be four Doppler frequency bands, the abscissa axis is indicative of a Doppler frequency (Hz), and the ordinate axis is indicative of a Signal to Noise Ratio (SNR) ($E_c/N_0$[dB]).

In the case of arranging a variety of channel estimation coefficients in order of optimized velocities as shown in FIG. 2, reception performances of individual channel estimation coefficients can be acquired as shown in plots for respective frequency bands 210, 220, 230, and 240. The Doppler frequency band corresponding to each channel estimation coefficient ($COEF_{Indx}$) is changed to another Doppler frequency band corresponding to a channel estimation coefficient having the best performance. In other words, in a first frequency range of 0-97 Hz, the plot 210 having the lowest SNR has the best reception performance, such that the velocity estimator 120 divides a corresponding Doppler frequency band by the first Doppler frequency band of 0-250. In a frequency range of 97-190 Hz, the plot 220 having the lowest SNR has the best reception performance, such that the velocity estimator 120 divides an overall Doppler frequency band by a second Doppler frequency band of 250-260. In a frequency range of 190-309 Hz, the plot 230 having the lowest SNR has the best reception performance, such that the velocity estimator 120 divides an overall Doppler frequency band by a third Doppler frequency band of 260-270. In a Doppler frequency band after the third Doppler frequency band boundary 270, the plot 240 has the best reception performance. In this way, if another graph shows the best reception performance, the Doppler frequency division is performed.

The velocity estimator 120 detects boundary frequencies 250, 260, and 270 from a Doppler frequency band, and transmits detected velocity information to the channel estimator 110, such that it controls a channel estimation coefficient to be used. Therefore, if the channel estimation coefficients are denoted by $COEF_0$, $COEF_1$, $COEF_2$, and $COEF_3$ in ascending velocity order, the channel estimator 110 uses the channel estimation coefficient $COEF_0$ in the first Doppler frequency band of 0-250, uses the channel estimation coefficient $COEF_1$ in the second Doppler frequency band of 260-270, uses the channel estimation coefficient $COEF_2$ in the third Doppler frequency band of 260-270, and uses the channel estimation coefficient $COEF_3$ in the fourth Doppler frequency band of 270-280.

The DFT for detecting the Doppler frequency band collects $M_{vel}$ input signal samples, and is applied to a minimum number (q) of frequency indexes ($n_i$) (where i=0~q−1) capable of classifying $M_{vel}$ Doppler frequency bands. In this case, the frequency index ($n_i$) at which the DFT is performed is determined in order to classify the $M_{vel}$ Doppler frequency bands.

A method for measuring a power spectrum to perform velocity estimation in the aforementioned mobile communication BS system will hereinafter be described.

Figure 3:
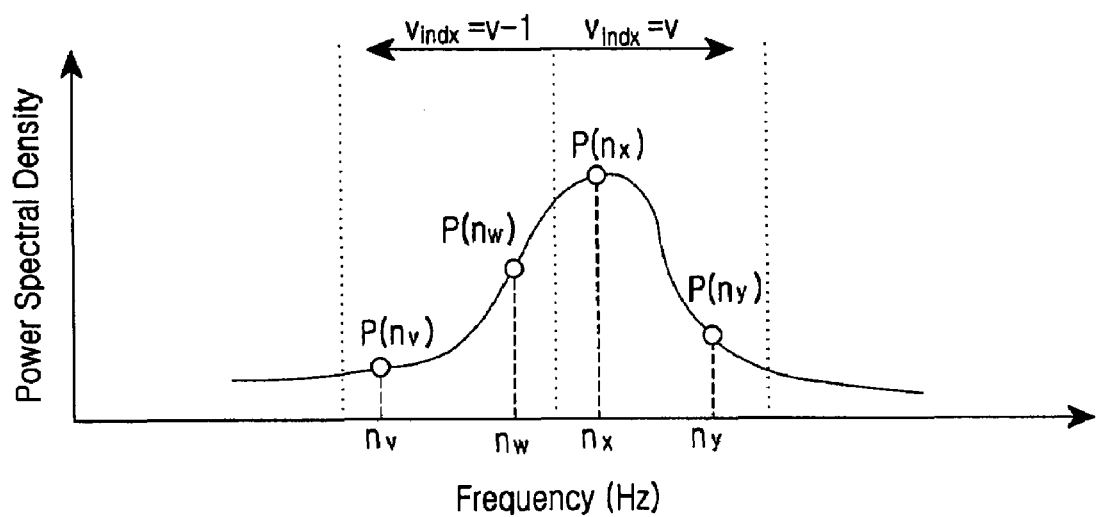
FIG. 3 is a view illustrating an operation for measuring a power spectrum associated with a frequency index to classify a velocity band into several velocity bands in accordance with an embodiment of the present invention.

FIG. 3 is a view illustrating an operation for measuring a power spectrum associated with a frequency index for classifying a velocity band into several velocity bands in accordance with an embodiment of the present invention. In FIG. 3, the abscissa axis is indicative of a frequency (Hz), and the ordinate axis is indicative of a power spectral density. The velocity band ($v_{Indx}$) is classified into $v_{Indx}$=v−1, and $v_{Indx}$=v($1 \leq v_{Indx} \leq M_{vel}-1$). Each velocity band includes two frequency indexes. Specifically, 'q' is determined to be $2M_{vel}$.

The velocity estimator 120 measures a power spectrum in association with frequency indexes $n_x$ and $n_y$ ($0 \leq v, w, x, y \leq q-1$) of the second velocity band (v) different from the frequency indexes $n_v$ and $n_w$ of the first velocity band (v−1). In this case, in the case of measuring the power spectrum using two frequency indexes to detect only one velocity band, the velocity estimator 120 detects the velocity using the following equation 1:

$$\text{if } \left(\max_{n_i}\{P(n_i), i = 0 \sim q-1\} = n_0 \text{ or } n_1\right), \text{ then } v_{Indx} = 0.$$

$$\vdots$$

$$\text{elseif } \left(\max_{n_i}\{P(n_i), i = 0 \sim q-1\} = n_v \text{ or } n_w\right), \text{ then } v_{Indx} = v-1.$$

$$\text{elseif } \left(\max_{n_i}\{P(n_i), i = 0 \sim q-1\} = n_x \text{ or } n_y\right), \text{ then } v_{Indx} = v.$$

$$\vdots$$

$$\text{elseif } \left(\max_{n_i}\{P(n_i), i = 0 \sim q-1\} = n_{q-2} \text{ or } n_{q-1}\right), \text{ then } v_{Indx} = M_{vel}-1.$$

Equation 1

The velocity estimator transmits a velocity band ($v_{Indx}$) estimated by Equation 1 to the channel estimator, and controls the channel estimator to use the channel estimation coefficient $COEF_{Indx}$ corresponding to the estimated velocity band. In this case, provided that frequency resolution of the Doppler power spectrum, such as a time interval of the input signal sample, is determined to be 'T', a frequency interval of an adjacent DFT sample can be calculated using the following equation 2:

$$\text{frequency resolution} = \frac{1}{T \times M_{dft}}$$

Equation 2

The frequency resolution is fixed to a predetermined value according to the DFT size. With reference to Equation 2, the velocity estimator 120 considers the mutual relationship between a desired frequency boundary value ($f_{desired}$) (such as a frequency detection position) and a detected frequency boundary value ($f_{detected}$) at which there arise detection variations of $v_{Indx}$=v−1 and $v_{Indx}$=v, such that it can guarantee optimum channel estimation performances as shown in graphs 250, 260, and 270 of FIG. 2. In this case, if an input sample period and the DFT size are determined, $f_{desired}$ is determined between frequency intervals of frequency indexes established to estimate a frequency spectrum. $f_{detected}$ is determined between frequency intervals $n_w/(T^*M_{dft})$ and $nx/(T^*M_{dft})$ of frequency indexes corresponding to frequency resolutions. $f_{desired}$ is indicative of a frequency boundary value depending upon performance of the channel estimation coefficient, and can be represented by the following equation 3 with respect to the value of $f_{detected}$.

$$f_{desired} = f_{detected} + \Delta f, |\Delta f| < (n_x - n_w)/(T \times M_{dft})$$

Equation 3

Specifically, a frequency position difference occurs in the range of a multiple of the frequency resolution. The frequency position difference performs velocity detection at frequencies $f_{desired}$ and $f_{detected}$, resulting in deterioration of reception performance. In order to prevent the reception performance from being deteriorated, a detection logic shown in the following equation 4 must be considered.

$$\text{if } \left(\max_{n_i}\{\beta_{n_i} \bullet P(n_i), i = 0 \sim q-1\} = n_0 \text{ or } n_1\right), \text{ then } v_{Indx} = 0.$$

$$\vdots$$

$$\text{elseif } \left(\max_{n_i}\{\beta_{n_i} \bullet P(n_i), i = 0 \sim q-1\} = n_v \text{ or } n_w\right), \text{ then } v_{Indx} = v-1.$$

$$\text{elseif } \left(\max_{n_i}\{\beta_{n_i} \bullet P(n_i), i = 0 \sim q-1\} = n_x \text{ or } n_y\right), \text{ then } v_{Indx} = v.$$

$$\vdots$$

$$\text{elseif } \left(\max_{n_i}\{\beta_{n_i} \bullet P(n_i), i = 0 \sim q-1\} = n_{q-2} \text{ or } n_{q-1}\right), \text{ then } v_{Indx} = M_{vel}-1.$$

Equation 4

The velocity estimator multiplies a power spectrum $P(n_i)$ estimated at a frequency sampling position $n_i$ ($i=0 \sim q-1$) by a weight value $\beta_{ni}$, compares the magnitude of the original power spectrum with the magnitude of the multiplied power spectrum result, detects a frequency boundary value $f_{detected}$, and controls the value of $f_{detected}$ to virtually approximate the value of $f_{desired}$.

Referring to FIG. 3, in the case of $\beta_{nw} > \beta_{nx}$, the value of $f_{detected}$ moves to the right, such that it becomes higher. In the case of $\beta_{nw} < \beta_{nx}$, the value of $f_{detected}$ moves to the left, such that it becomes lower. A weight value for the power spectrum can be denoted by the following equation 5 configured in the form of a matrix.

$$(\beta_{i,j}) = \begin{bmatrix} \beta_{0,0} & \beta_{1,0} & \cdots & \cdots & \beta_{q-2,0} & \beta_{q-1,0} \\ \beta_{0,1} & \beta_{1,1} & \cdots & \cdots & \beta_{q-2,1} & \beta_{q-1,1} \\ \vdots & \vdots & \vdots & \vdots & \vdots & \vdots \\ \beta_{0,M_{vel}-2} & \beta_{1,M_{vel}-2} & \cdots & \cdots & \beta_{q-2,M_{vel}-2} & \beta_{q-1,M_{vel}-2} \\ \beta_{0,M_{vel}-1} & \beta_{1,M_{vel}-1} & \cdots & \cdots & \beta_{q-2,M_{vel}-1} & \beta_{q-1,M_{vel}-1} \end{bmatrix}$$

Equation 5

With reference to Equation 5, $\beta_{i,j}$ is indicative of a weight value multiplied by the power spectrum measured at a frequency sampling position $n_j$ if a velocity band is determined to be $v_{Indx}=j$. In this way, operations for finely or precisely controlling the value of $f_{detected}$ will hereinafter be described.

Figure 4:
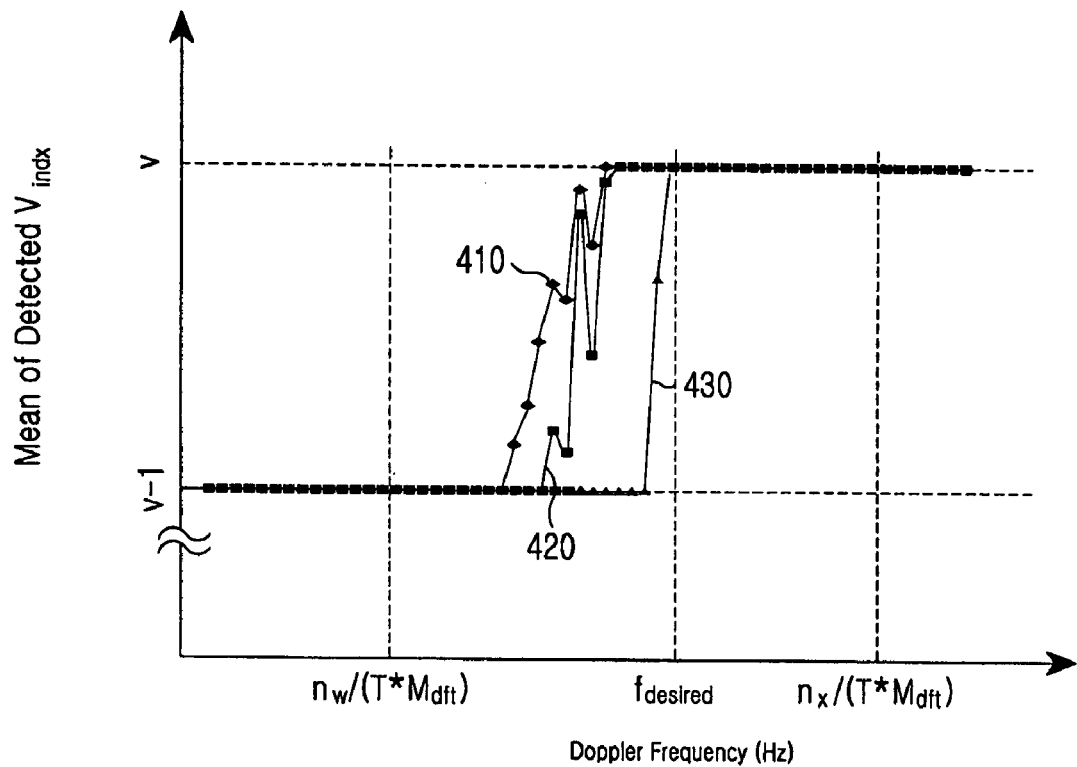
FIG. 4 is a view illustrating an operation for controlling a velocity detection position in a velocity estimator in accordance with an embodiment of the present invention.

FIG. 4 is a view illustrating the operation for controlling a velocity detection position in a velocity estimator in accordance with an embodiment of the present invention. In FIG. 4, the abscissa axis is indicative of a Doppler frequency (Hz), the ordinate axis is indicative of a measured velocity band. According to an embodiment of the present invention, it is assumed that 'T' is a 256-chip, and '$M_{dft}$' is a 256-point. Reference numeral 410 is indicative of a detection result in the case of $\delta=0.5$, reference numeral 420 is indicative of a detection result in the case of $\delta=1.0$, and reference numeral 430 is indicative of a detection result in the case of $\delta=2.0$, wherein $\delta$ is a specific $\beta$. In other words, as the specific weight value, the $\delta$ indicates the weight value for finely or precisely controlling a value of $f_{detected}$ to approach to a value of $f_{desired}$ in the range of Doppler frequency bands corresponding to $n_w$ and $n_x$.

$$(\beta_{i,j}) = \begin{bmatrix} \vdots & \vdots & \cdots & \cdots & \vdots & \vdots \\ \vdots & \vdots & \delta & 1 & \vdots & \vdots \\ \vdots & \vdots & 1 & 1 & \vdots & \vdots \\ \vdots & \vdots & \cdots & \cdots & \vdots & \vdots \\ \vdots & \vdots & \cdots & \cdots & \vdots & \vdots \end{bmatrix} \begin{matrix} \\ \leftarrow v_{Indx}=v-1 \\ \leftarrow v_{Indx}=v \\ \\ \\ \end{matrix}$$

$$\uparrow \quad \uparrow$$
$$n_w \quad n_x$$

Equation 6

With reference to Equation 6, the plot 420 is indicative of a case in which there is no multiplication of a weight value, and is also indicative of a velocity band $v_{Indx}$ fixedly detected by the selection result of $n_w$ and $n_x$. The plot 410 is indicative of a velocity band $v_{Indx}$ detected when a weight value becomes lower (i.e., when the weight value moves to the left on the basis of the plot 420). The plot 430 is indicative of a velocity band $V_{Indx}$ detected when a weight value becomes higher (i.e., when the weight value moves to the right on the basis of the plot 410).

The velocity estimator finely or precisely controls a velocity detection position according to the magnitude of the weight value of Equation 5, such that the velocity detection position is finely or precisely controlled in the range of a frequency range of $n_w$ and $n_x$. For example, if a frequency position detected according to $\delta$ is equal to $\delta=0.5$, the value of $f_{detected}$ is indicative of the plot 410. If the real detected frequency position is equal to $\delta=1$, the value of $f_{detected}$ is indicative of the plot 420. If the detected frequency position is equal to $\delta=2$, the value of $f_{detected}$ is indicative of the plot 430. A method for controlling the velocity estimator to finely or precisely adjust a velocity detection position according to the aforementioned operations will hereinafter be described.

Figure 5:
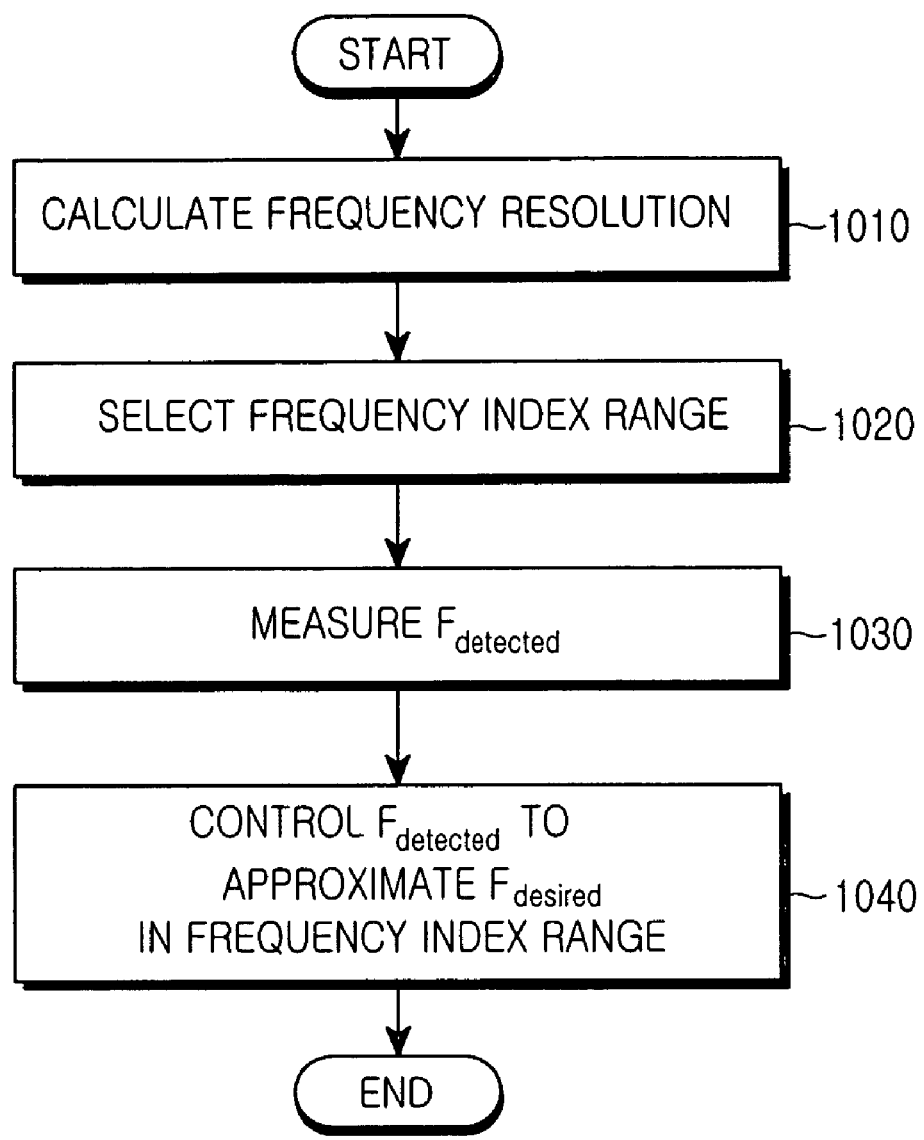
FIG. 5 is a flow chart illustrating a method for finely controlling a velocity detection position in accordance with an embodiment of the present invention.

FIG. 5 is a flow chart illustrating a method for finely controlling a velocity detection position in accordance with an embodiment of the present invention.

Referring to FIG. 5, a velocity estimator calculates frequency resolution using Equation 2 at step 1010, and calculates a frequency interval of an adjacent DFT sample.

The velocity estimator detects a maximum power spectrum at a frequency band $v_{Indx}=v$ to select a frequency index range at step 1020, and selects a frequency index $n_x$ corresponding to the detected maximum spectrum and another frequency index $n_w$ corresponding to a maximum power spectrum detected at $V_{Indx}=v$ at step 1020. Therefore, the velocity estimator measures a real detection frequency boundary value of $f_{detected}$ at which a detection variation occurs in the selected frequency index range at step 1030.

The velocity estimator controls the value of $f_{detected}$ to approximate a desired frequency boundary value of $f_{desired}$ in the range of the frequency index range at step 1040.

As apparent from the above description, the embodiments of the present invention finely or precisely controls a Doppler band detection position of a velocity estimator, such that performance of an optimized channel estimator can be guaranteed and the decoding performance of a received signal can be improved.

Although certain embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for estimating a velocity of a mobile station (MS) to adjust a velocity detection position of a velocity estimator in a Base Station (BS) apparatus of a mobile communication system including the velocity estimator for estimating the velocity of the MS and a channel estimator for performing channel estimation using a plurality of channel estimation coefficients according to a control signal of the velocity estimator, comprising the steps of:

estimating reception performance of individual channel estimation coefficients of the channel estimator, and selecting boundary frequencies of a plurality of Doppler frequency bands corresponding to a channel estimation coefficient having the best reception performance;

measuring a power spectrum associated with a minimum number of frequency indexes capable of classifying the plurality of Doppler frequency bands; and controlling a detection position such that a Doppler frequency boundary value measured when a weight value is applied to the measured power spectrum approximates a desired Doppler frequency boundary value.

2. The method according to claim 1, wherein the determination step of the boundary frequency includes the steps of:

estimating reception performances of individual channel estimation coefficients optimized for each velocity band from among a plurality of velocity bands;

determining a Doppler frequency band corresponding to each channel estimation coefficient to be a Doppler frequency band corresponding to a channel estimation coefficient having the best performance; and selecting a boundary frequency of the determined Doppler frequency band.

3. The method according to claim 1, wherein the control step of the detection position includes the step of:

multiplying the measured power spectrum by the weight value to perform a comparison between individual magnitudes, comparing a magnitude of the measured power spectrum with a magnitude of the multiplied result, and applying the weight value to the measured power spectrum.

4. The method according to claim 1, wherein the channel estimation coefficient is optimized for a predetermined number of Doppler frequency bands, in which the predetermined number is equal to a predetermined number of velocity bands.

5. An apparatus for estimating a velocity of a mobile station (MS) in a base station (BS) device of a mobile communication system, comprising:

a channel estimator classified according to a velocity band, for performing channel estimation using channel estimation coefficients optimized for individual velocity bands; and a velocity estimator for estimating reception performances of individual channel estimation coefficients, selecting a boundary frequency of Doppler frequency bands corresponding to channel estimation coefficients having the best reception performance, measuring a power spectrum associated with a minimum number of frequency indexes capable of classifying the Doppler frequency bands, applying a weight value to the measured power spectrum, controlling a detection position to approximate a desired Doppler frequency boundary value in a Doppler frequency boundary value measured when a weight value is applied to the measured power spectrum, and performing velocity estimation in a base station.

6. The apparatus according to claim 5, wherein:

the velocity estimator estimates reception performances of individual channel estimation coefficients optimized for each velocity band from among a plurality of velocity bands, determines a Doppler frequency band corresponding to each channel estimation coefficient to be a Doppler frequency band corresponding to a channel estimation coefficient having the best performance, and selects a boundary frequency of the determined Doppler frequency band.

7. The apparatus according to claim 5, wherein the detection position control of the velocity estimator is performed when the measured power spectrum is multiplied by the weight value, a magnitude of the measured power spectrum is compared with that of the multiplied result, and the weight value is then applied to the measured power spectrum.

8. The apparatus according to claim 5, wherein the channel estimation coefficient is optimized for a predetermined number of Doppler frequency bands, in which the predetermined number is equal to a predetermined number of velocity bands.

* * * * *